(12) United States Patent
Keinänen et al.

(10) Patent No.: US 11,041,540 B2
(45) Date of Patent: Jun. 22, 2021

(54) PROTECTION AGAINST EXCESSIVE FORCES IN A SUSPENSION ARRANGMENT

(71) Applicant: Teknologian tutkimuskeskus VTT Oy, Espoo (FI)

(72) Inventors: Jarkko Keinänen, Espoo (FI); Kalle Vehviläinen, Espoo (FI); Ismo Vessonen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 741 days.

(21) Appl. No.: 15/039,051

(22) PCT Filed: Nov. 25, 2014

(86) PCT No.: PCT/FI2014/050907
§ 371 (c)(1),
(2) Date: May 25, 2016

(87) PCT Pub. No.: WO2015/079109
PCT Pub. Date: Jun. 4, 2015

(65) Prior Publication Data
US 2017/0159744 A1 Jun. 8, 2017

(30) Foreign Application Priority Data

Nov. 27, 2013 (FI) .................................. 20136182

(51) Int. Cl.
*F16F 15/04* (2006.01)
*F16F 15/03* (2006.01)
(Continued)

(52) U.S. Cl.
CPC ............ *F16F 15/03* (2013.01); *B60G 13/003* (2013.01); *B60G 17/019* (2013.01);
(Continued)

(58) Field of Classification Search
CPC .... F16F 15/03; F16F 15/12353; F16F 15/022; F16F 15/06; F16F 15/067; F16F 15/02; F16F 2222/06; B60G 13/16; B60G 13/18
See application file for complete search history.

(56) References Cited

U.S. PATENT DOCUMENTS 3,770,290 A 11/1973 Bottalico
3,941,402 A 3/1976 Yankowski et al.
(Continued)

FOREIGN PATENT DOCUMENTS

CN 1707011 A 12/2005
CN 201566443 U 9/2010
(Continued)

OTHER PUBLICATIONS

English language translation of Akagi et al (JP 61-146610). (Year: 1986).*

*Primary Examiner* — Bradley T King
*Assistant Examiner* — Stephen M Bowes
(74) *Attorney, Agent, or Firm* — Laine IP Oy

(57) ABSTRACT

A simple and robust suspension arrangement is provided for taking into account different suspension modes without the need for excessive sensing or electronics. The novel suspension arrangement includes a first suspension element, which directly suspends the object to the frame, and a second suspension element, which suspends the object to the frame through a magnetic coupling between the object and the second suspension element. The magnetic coupling provides a magnetic coupling force ($F_h$) to act as a threshold such that the suspension arrangement is designed to magnetically decouple the second suspen-sion element from the object when the excitation force ($F_e$) transmitted be-tween the frame and the object exceeds the magnetic coupling force ($F_h$).

13 Claims, 15 Drawing Sheets

(51) Int. Cl.
    *B60G 17/015*    (2006.01)
    *F16F 15/02*     (2006.01)
    *B60G 13/00*     (2006.01)
    *B60G 17/019*    (2006.01)
    *F16F 15/00*     (2006.01)
    *F16F 15/18*     (2006.01)

(52) U.S. Cl.
    CPC .......... *B60G 17/0152* (2013.01); *F16F 15/00* (2013.01); *F16F 15/02* (2013.01); *F16F 15/18* (2013.01); *B60G 2204/128* (2013.01); *B60G 2401/17* (2013.01); *F16F 2230/24* (2013.01)

(56) References Cited

U.S. PATENT DOCUMENTS

| | | | |
|---|---|---|---|
| 3,952,979 A * | 4/1976 | Hansen | F16F 15/02 188/1.11 E |
| 6,035,980 A | 3/2000 | Fujita et al. | |
| 2007/0089245 A1 | 4/2007 | Kim et al. | |
| 2007/0273074 A1 * | 11/2007 | Mizuno | B60G 17/0157 267/140.15 |
| 2012/0010780 A1 | 1/2012 | Hayashi et al. | |
| 2012/0119463 A1 * | 5/2012 | Paulides | F16F 6/00 280/124.106 |
| 2013/0180350 A1 | 7/2013 | Kraus et al. | |

FOREIGN PATENT DOCUMENTS

| | | |
|---|---|---|
| CN | 203067649 U | 7/2013 |
| JP | S42007849 | 3/1942 |
| JP | S6095010 U | 5/1985 |
| JP | S61146610 A | 7/1986 |
| JP | S62221909 A | 9/1987 |
| JP | H03718 Y2 | 1/1991 |
| JP | H03181637 A | 8/1991 |
| JP | H06312616 A | 11/1994 |
| JP | 2938848 B1 | 8/1999 |
| JP | 2003104025 A | 4/2003 |
| JP | 2009241813 A | 10/2009 |
| WO | WO 2010113329 A1 | 10/2010 |

* cited by examiner

PROTECTION AGAINST EXCESSIVE FORCES IN A SUSPENSION ARRANGMENT

FIELD OF THE INVENTION

The present invention relates to suspension arrangements. More specifically, the invention relates to a suspension arrangement according to the preamble portion of claim 1.

BACKGROUND ART

Suspending an object to a frame is a compromise between stability and comfort. In order to protect equipment, personnel or a structure, such as a vehicle against shocks, the suspension should be soft enough to absorb impacts between the frame and the suspended object. However, in most applications soft isolation alone cannot be used because maximised isolation will typically make the object unstable thus preventing the normal use thereof. On the other hand, the suspension between the object and frame should be rigid during normal operation in order to keep the stability and also prevent the isolated or suspended personnel from feeling sickness from the low frequency oscillation. Let us consider the suspension of a vehicle for example. During driving on a smooth surface, it is preferred that the suspension is rigid for stability of the vehicle, whereas the suspension should be soft during shocks caused by bumps or holes in the road. Such a passive suspension is therefore not ideal.

There have been numerous attempts to optimise suspension arrangements between a frame and the suspended object. Such attempts typically feature a regulator in the suspension designed to sensor the dynamics of the object, such as acceleration, and to alter the damping characteristics of the suspension elements accordingly. Alternatively the suspension characteristics are altered by the user. One example of such a suspension arrangement is presented in US 2010/0276906 A1, which discloses suspension system for a vehicle, which suspension system with a damping assembly operatively connected to an actuator and a controller for controlling movement of the actuator thus regulating the damping rate of the damping assembly. The suspension system makes use of a signal generating device, which provides an output electric signal representing a desired user adjustment to the damping rate of the damping assembly.

Whether the adjustment is made by the user or automatically by a sensor arrangement, such systems have a tendency to be quite complicated and therefore expensive and delicate.

It is therefore an aim of the present invention to provide a simple and robust suspension arrangement capable of taking into account different suspension modes without the need for excessive sensoring or electronics.

SUMMARY

The aim of the present invention is achieved with aid of a novel suspension arrangement for suspending an object to a frame for protection against excessive excitation forces transmitted from between the frame or and the object. The arrangement includes a first suspension element, which directly suspends the object to the frame, and a second suspension element, which suspends the object to the frame through a magnetic coupling between the object and the second suspension element. The magnetic coupling provides a magnetic coupling force to act as a threshold such that the suspension arrangement is designed to magnetically decouple the second suspension element from the object when the excitation force transmitted between the frame and the object exceeds the magnetic coupling force.

More specifically, the suspension arrangement according to the present invention is characterized by the characterizing portion of claim 1.

Considerable benefits are gained with aid of the present invention.

Compared to conventional passive suspension arrangements, the proposed solution provides a remarkable improvement to the isolation properties of the suspension. For example, where an impact is of an order of 10-200 G, the proposed suspension arrangement may be able to reduce the impact transmitted to the isolated object to less than one G. This is a considerable reduction, which is beneficial in protecting for example delicate measuring apparatuses or personnel of sea vessels or land vehicles against sudden unanticipated shocks, or personnel in vehicles or sea vessels designed for rough sea or terrain.

The benefits of the proposed suspension arrangement compared conventional passive methods include outstanding protection against shocks, which leads to increased durability, and stability. A particular advantage compared to fuse-like safety systems is that the novel arrangement is reversible, whereby the arrangement may be used over and over again. Compared to active or semi-active suspension arrangements, the proposed solution is significantly simpler in construction, which makes it reliable and affordable. Furthermore the novel suspension arrangement can react instantly to shock, transient or high vibration loading. It is to be noted that active systems will always have some internal delay built in because sensors etc. must notice the shock loading before it can deliver order to move from stiff to soft state. The proposed suspension arrangement is reversible which is great advantage compared to many one-shot arrangements that are used in military applications.

BRIEF DESCRIPTION OF DRAWINGS

In the following, exemplary embodiments of the invention are described in greater detail with reference to the accompanying drawings in which.

DETAILED DESCRIPTION OF EXEMPLARY EMBODIMENTS

Figure 1:
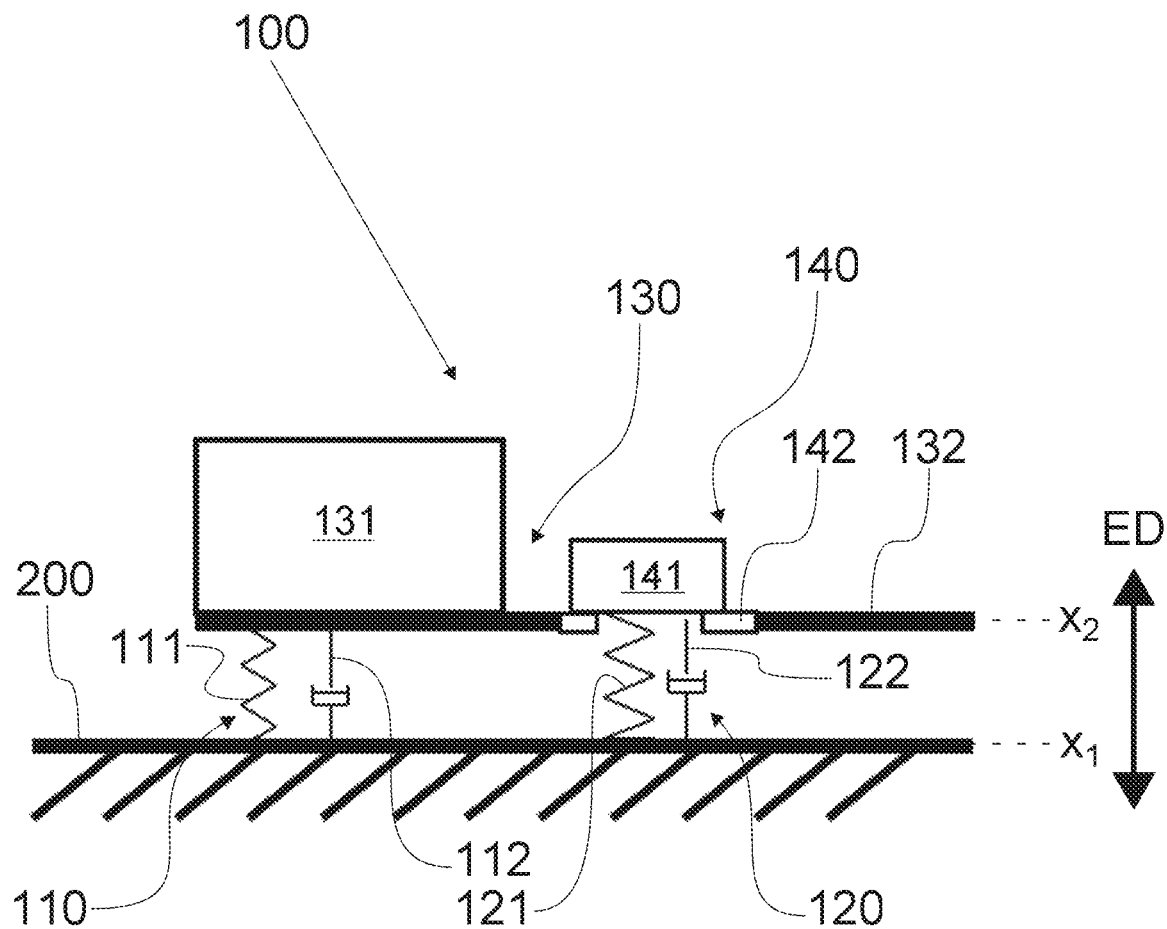
FIG. 1 presents a schematic illustration of a suspension arrangement according to a first embodiment before and after a shock.

An exemplary embodiment is described with reference to FIGS. 1 and 2, wherein a simple suspension arrangement 100 is illustrated. In the shown example, an object 130 is suspended to a frame 200 by means of two suspension elements, namely a first and second suspension element 110, 120, respectively. The first and second suspension elements 110, 120 are coupled to the object 130 via a coupling interface 132, which in the FIGS. has been depicted as a mere platform connecting the suspension elements 110, 120 to the object 130 in parallel. It would also be possible to arrange the suspension elements 110, 120 on opposite sides of the object 130, whereby the frame 200 would surround the object 130 (not shown). The coupling interface 132 connects to or forms part of a mass 131, which is to be suspended to the frame 200. In the illustrated example, the mass 131 is approximated to form all of the mass of the object 130, whereas the coupling interface 132 is assumed weightless. Instead of a suspension arrangement, the novel concept could also be referred to as a suspension apparatus, which includes the disclosed elements. The expression suspension arrangement is nevertheless used throughout this disclosure.

Figure 6A:
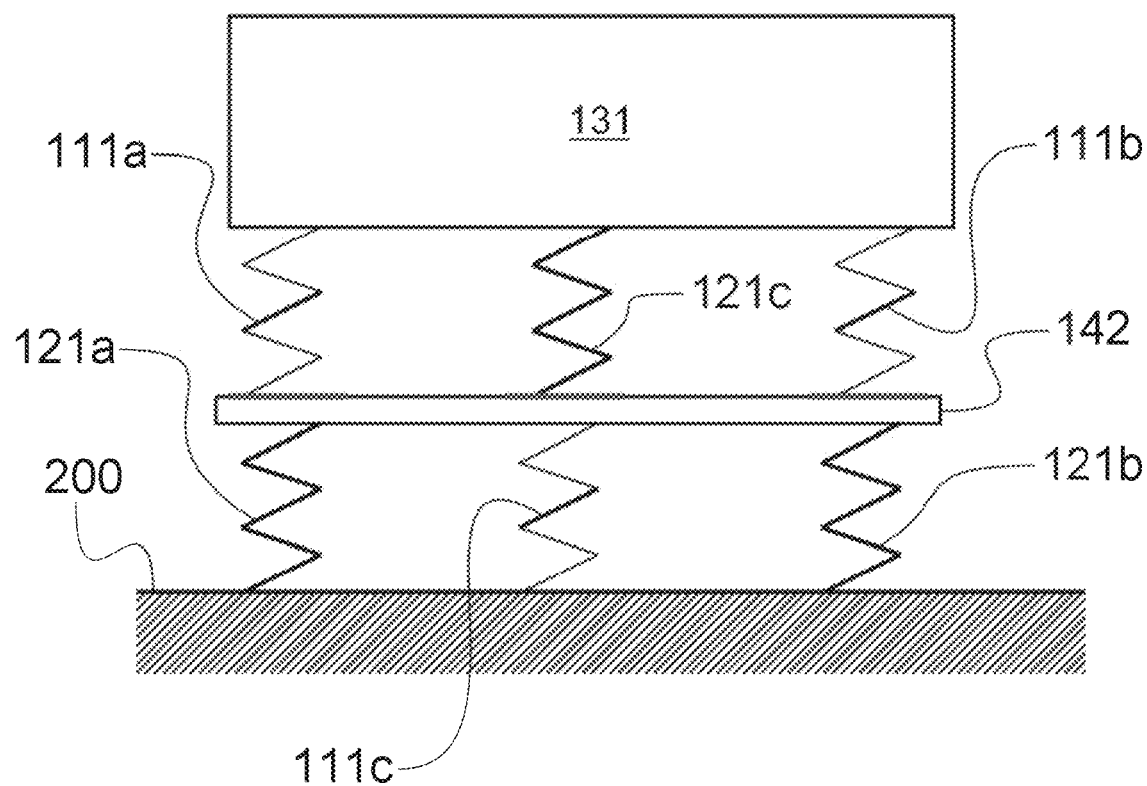
FIG. 6a presents a schematic illustration of a suspension arrangement according to a fourth embodiment before and after a shock.
Figure 6B:
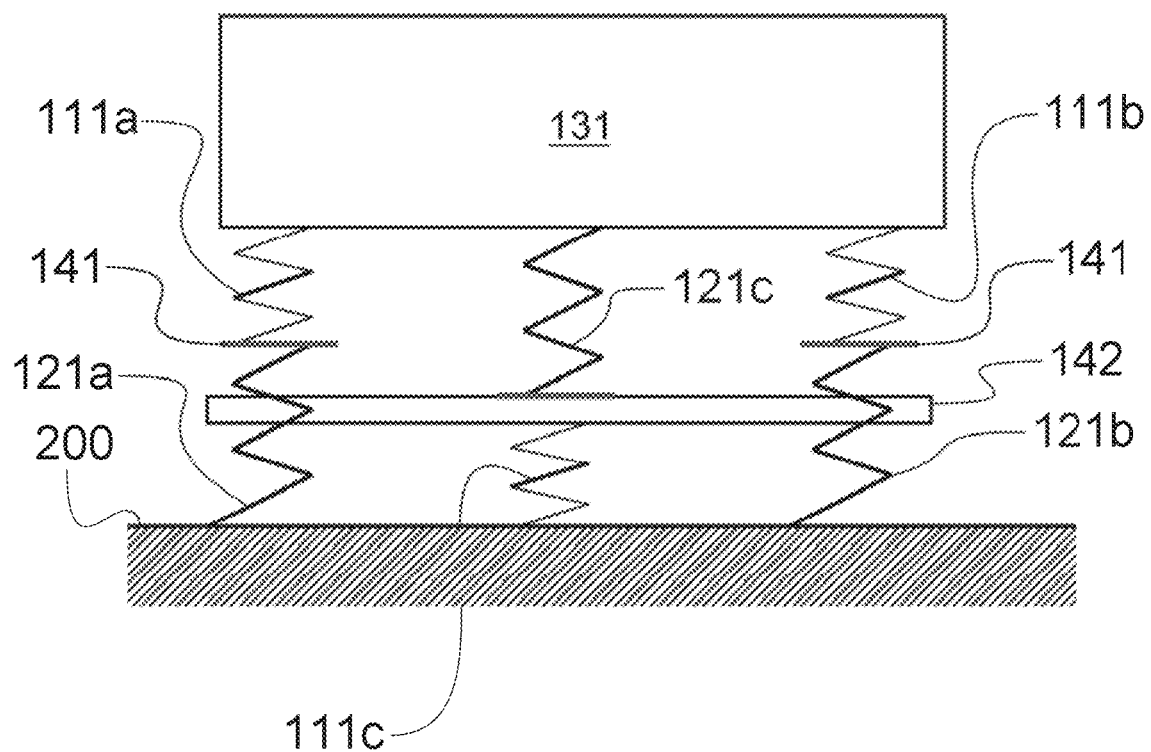
FIG. 6b presents a schematic illustration of the suspension arrangement of FIG. 6a during a shock, where the frame has moved upwards.
Figure 6C:
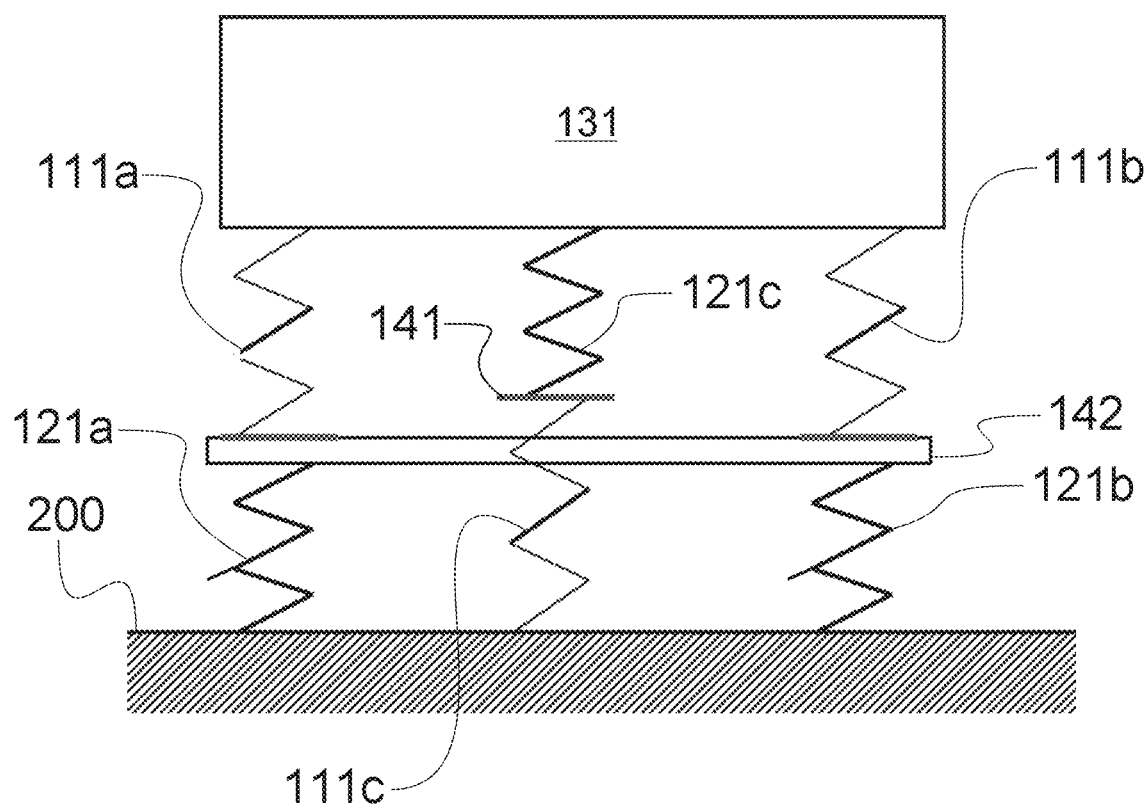
FIG. 6c presents a schematic illustration of the suspension arrangement of FIG. 6a during a shock, where the frame has moved downwards.

In the shown embodiment, both suspension elements 110, 120 include a spring and a damper. In this context it is to be understood that the damper may employ any suitable method for damping, for example viscosity, friction, electrical, pneumatic etc. In the illustrated embodiments, a conventional viscose damper is depicted. The spring 111 and damper 112 of the first suspension element 110 are coupled in parallel and permanently to the coupling interface 132 and ultimately to the mass 131 and on the other hand to the frame 200. In other words, a first suspension element 110 is configured to directly suspend the object 130 to the frame 200. In this context the expression direct suspension means that the object is resiliently fixed to the frame by the first suspension element in a permanent fashion. Such permanent attachment is to be understood as lacking a connection through a clutch or similar detachable coupling, which is configured to automatically disengage in a reaction to load (cf. connection of the second suspension element 120 through a magnetic coupling 140). It is to be noted that the shown example shows a spring and a damper in both suspension elements. However as is shown hereafter in connection with FIGS. 6a to 6c, a suspension element may also be arranged with a spring or damper only. The spring 121 and damper 122 of the second suspension 120 are also arranged in parallel to connect the frame 200 to the object 130, but said spring 121 and damper 122 are connected to the coupling interface 132 via a magnetic coupling 140. The magnetic coupling 140 includes two major components. Firstly, the magnetic coupling 140 features a magnet 141, which in the shown embodiment is a permanent magnet connected to the second suspension element 120 by combining the spring 121 and damper 122 thereof. Secondly, the magnetic coupling 140 includes a magnetically cooperating element 142, which may be of ferromagnetic material or an electromagnet, which is connected to the coupling interface 132. More specifically, the coupling interface 132 has an opening, the perimeter of which is provided with the magnetically cooperating element 142, which may be a metallic ring element, coating surrounding the opening. Alternatively, a metallic plate, two metallic parts above and below the magnet or a magnet may be used.

Figure 4A:
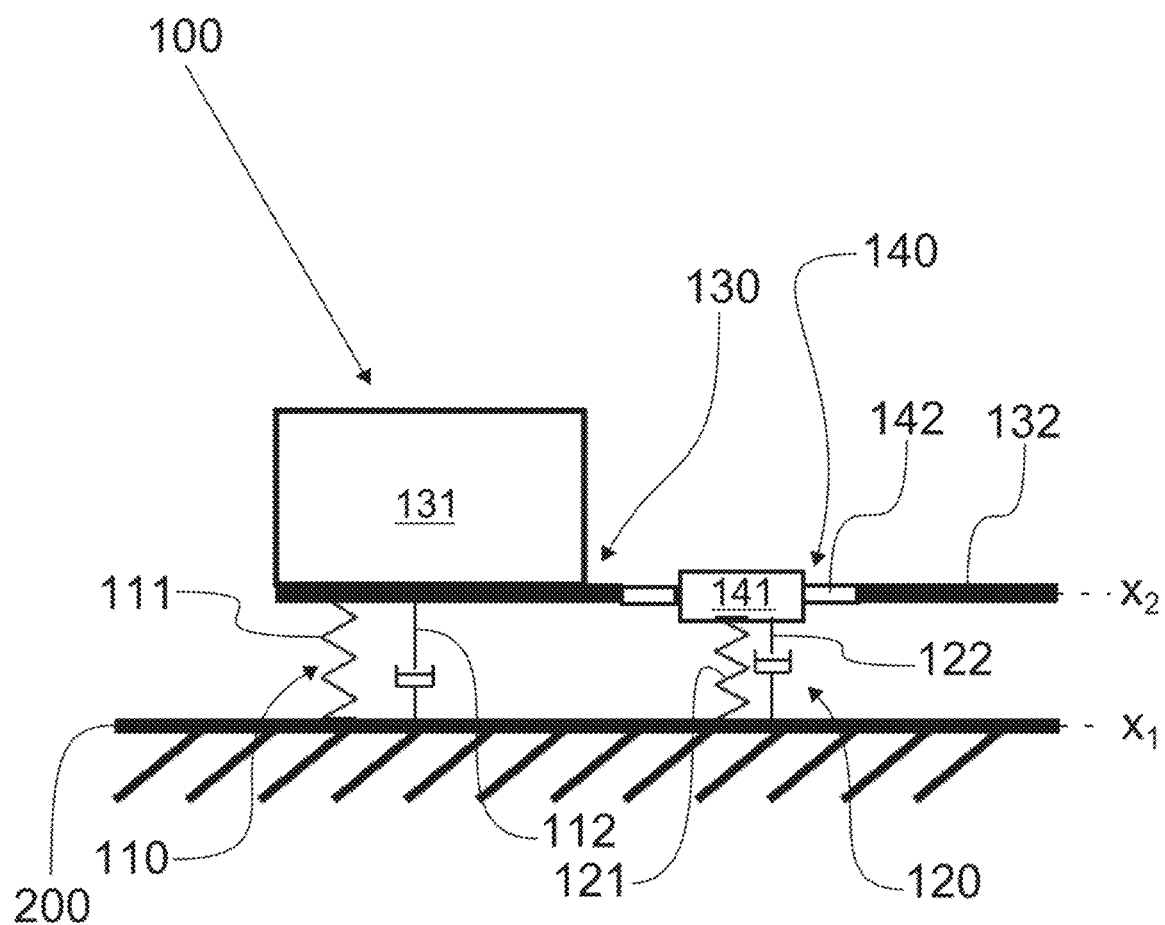
FIG. 4a presents a schematic illustration of a suspension arrangement according to a second embodiment during a shock.
Figure 4B:
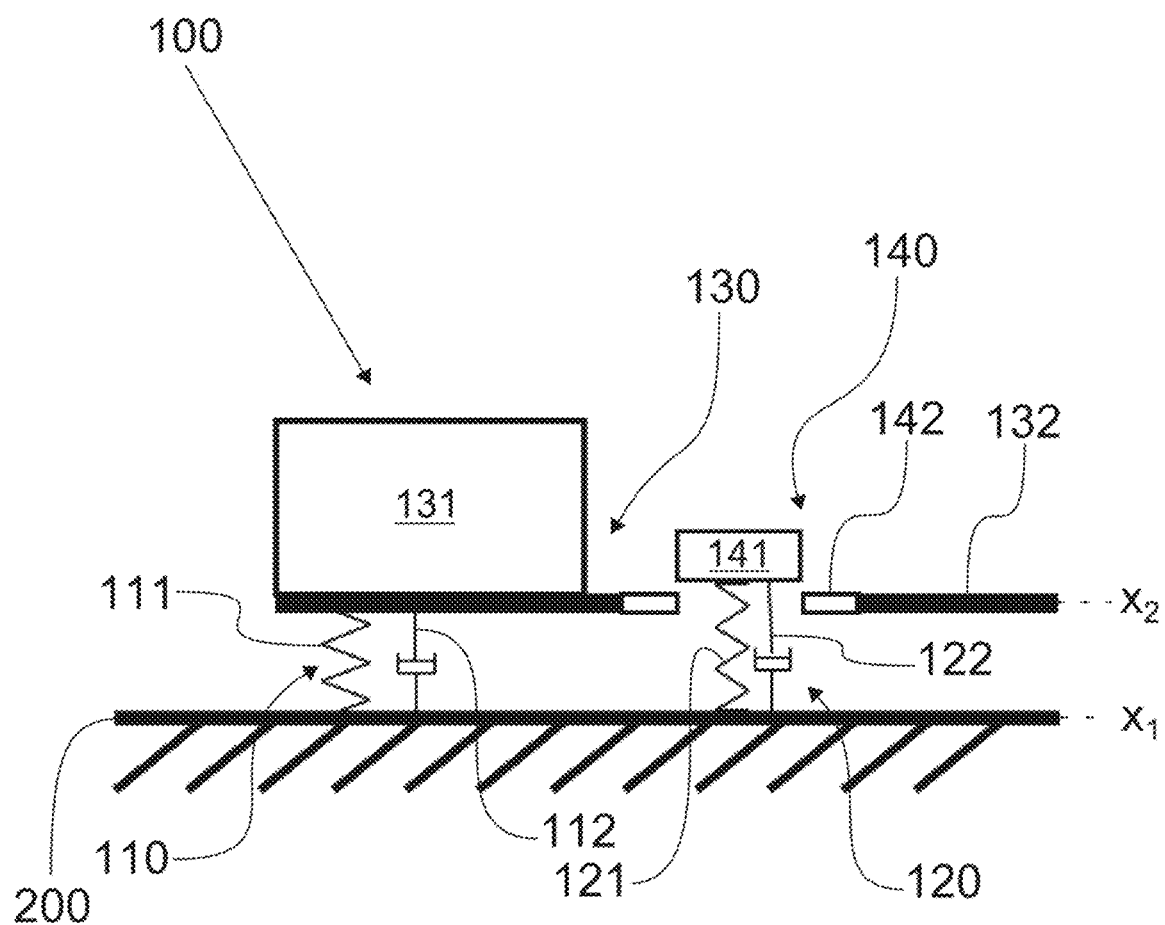
FIG. 4b presents a schematic illustration of the suspension arrangement of FIG. 4a during a shock, where the frame has moved upwards.
Figure 4C:
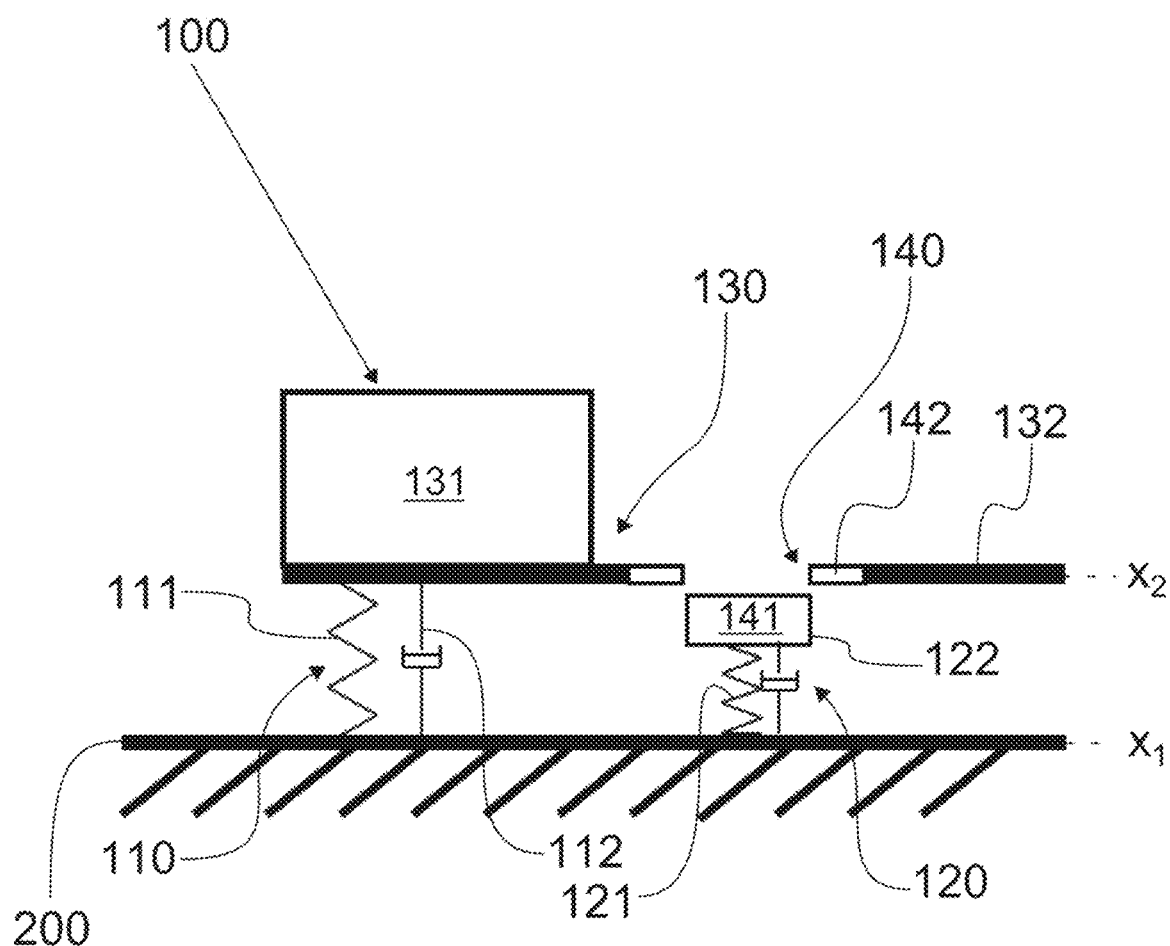
FIG. 4c presents a schematic illustration of the suspension arrangement of FIG. 4a during a shock, where the frame has moved downwards.

As an alternative embodiment (FIG. 4), the coupling interface can be also constructed so that the magnet 141 is in the middle of the magnetic element 142 or magnet 141 holds the magnetic element 142 from the side. Thus extra holding force is provided by the friction between the elements 141, 142 of the magnetic coupling 140. A great number of varieties may be constructed without using an opening in the coupling interface as shown in the Figs. Alternatively, an L, C or U shaped interface (not shown) could be used for establishing a similar effect.

It is clear that in all embodiments, the mutual positions of the elements 141, 142 of the magnetic coupling 140 may be reversed without affecting the function of the magnetic coupling 140.

The second suspension element 120 may have dynamic properties that are different from those of the first suspension element 110. More specifically, the second suspension 120 element is considerably stiffer than the first suspension element 110. While this is the case in the illustrated embodiments, it would also be possible to arrange similar suspension elements to act as the first and second suspension element 110, 120 or second suspension element 120 can be softer than first suspension element 110.

During normal operation, where the force between the frame 200 and first and second suspension element 110 and 120 is less than holding force of the magnetic coupling 140 between the permanent magnet 141 and the magnetically cooperating element 142, the forces transmitted between the frame 200 and the object 130 are transmitted through both the first and second suspension element 110, 120. When a shock loading occurs, the force between the frame 200 and object 130 exceeds the holding force of magnetic coupling 140, the contact between the elements of the magnetic coupling 140, namely the magnetically cooperating element 142 and the magnet 141, is lost. Consequently, the force between the frame 200 and object 130 is transmitted only through the first suspension element 110. In this context, the term shock is meant to refer to any impulse or transient loading or such impact transmitted from the frame 200 or from the object 130. Examples of such shocks include explosions, wheel of a vehicle (car, motorcycle, bicycle etc.) hitting a bump or rough terrain, start up or stop of an engine, failure in machine etc.

Next, the dynamics of the suspension are discussed in greater detail. In particular, the dynamic properties of the first and second suspension element 110, 120 are described. In this context the expression dynamic properties refers to typical suspension properties, which affect the performance of the suspension set-up. Such typical suspension properties include, among others, spring constant, damping constant or the combination thereof. The force transmitted from the motion of the frame 200 and transmitted to the object 130 via the suspension 110, 120 in normal operation (cf. FIG. 1) may be equated as follows:

$$F_e = m\ddot{x}_2 + c_1(\dot{x}_2 - \dot{x}_1) + k_1(x_2 - x_1) + c_2(\dot{x}_2 - \dot{x}_1) + k_2(x_2 - x_1), \quad (1)$$

where $F_e$ is the excitation force transmitted to the mass 131, m is the mass of the object 130, $\ddot{x}_2$ is the acceleration of the mass 131, $c_1$ is the damping constant of the damper 112 of the first suspension element 110, $k_1$ is the spring constant of the spring 111 of the first suspension element 110, $c_2$ is the damping constant of the damper 122 of the second suspension element 120, $k_2$ is the spring constant of the spring 121 of the second suspension element 120, $x_1$ and $x_2$ are the positions of the frame 200 and object 130 in a reference coordinate, respectively, whereby $x_2 - x_1$ is the displacement of the frame 200 in respect to the mass 131. Accordingly, $\dot{x}$ and $\ddot{x}$ denote the first and second derivatives of the position with respect to time, i.e. velocity and acceleration. It is to be noted that the damper 112 and 122 can also be based on friction or pneumatic etc. This calculation example is based on viscose damper elements. Furthermore, the excitation movement can also be caused by the object 130 and then the suspension arrangement is isolating the frame 200 (in the calculation example above the excitation movement comes from the frame 200 and suspension arrangement isolates the object 130).

While the excitation force $F_e$ is greater than the holding force of the magnetic coupling 140, the contact between the magnetically cooperating element 142 and the permanent magnet 141 is lost and the holding power is decreased significantly. When the permanent magnet 141 is not in contact with the magnetically cooperating element 142 (cf. FIG. 2), the force transmitted to the object 130 may be equated roughly as follows:

$$F_e = m\ddot{x}_2 + c_1(\dot{x}_2 - \dot{x}_1) + k_1(x_2 - x_1) \quad (2)$$

where $F_e$ is the excitation force transmitted to the mass 131, m is the mass of the object 130, $\ddot{x}_2$ is the acceleration of the mass 131, $c_1$ is the damping constant of the damper 112 of the first suspension element 110, $k_1$ is the spring constant of the spring 111 of the first suspension element 110, $x_1$ and $x_2$ are the positions of the frame 200 and mass 131 in a reference coordinate, respectively, whereby $x_2 - x_1$ is the displacement of the frame 200 in respect to the object 130. Accordingly, $\dot{x}$ and $\ddot{x}$ denote the first and second derivates of the position with respect to time, i.e. velocity and acceleration.

In view of the equations (1) and (2) above, the holding force $F_h$ of the magnetic coupling 140 may be designed with a simplified equation:

$$F_h = m \cdot a, \quad (3)$$

where m is the mass of the object 130, a is the acceleration of the frame 200, and $F_h$ is the holding force of the magnetic coupling 140, when $(x_2 - x_1) k_1 \ll F_h$ and $c_1(\dot{x}_2 - \dot{x}_1) \ll F_h$.

For example, when the mass of the object 130—such as protected equipment or personnel—is 100 kg and holding force of the magnetic coupling 140 is 80 kg, the maximum acceleration that can be transmitted through the suspension arrangement 100 is:

$$0.8 \cdot g \quad (4)$$

where g is the gravity (~9.82 m/s$^2$), when the natural frequency of the first suspension element 110 and object 130 is less than 1 Hz and the excitation displacement/force is in a reasonable area (e.g. a car driving to a bump or a mine explosion near a vessel or vehicle). This rough estimation is based on the fact that when $k_1$ and $c_1$ of the first suspension element 110 are chosen to be very loose, the excitation force does not reach the mass 131 because of the excellent vibration isolation properties of the loose first suspension element 110.

In normal operation (FIG. 1), the loose first suspension element 110 would not be optimal as the sole suspension element between the frame 200 and object 130 because the object 130 would not be stable in most applications. As an example, let us consider a gyroscope on a sea vessel. Under normal circumstances the gyroscope should be rigidly attached to the frame of the sea vessel for accurate measurements. The more rigid second suspension element 120 is therefore provided with a magnetic coupling 140. The second suspension element 120 may be rigid, even a steel bar for example, or at least much more rigid than first suspension element 110 to keep the protected or isolated object 130 stable. Because the magnetic coupling 140 keeps the object 130 suspended to the frame 200 in normal circumstances, the first and second suspension elements 110, 120 act in parallel. Therefore the second suspension element 120, which is stiffer than the first 110, is dominant, whereby the overall suspension characteristics of the suspension arrangement 100 is determined by the stiffer second suspension element 120.

When the sea vessel experiences a sudden shock in the excitation direction ED, such as a large upcoming wave or an underwater explosion for example, the delicate gyroscope should be gently suspended to the frame of the sea vessel. For switching from the stiff suspension provided by the second suspension element 120 to a more loose suspension, the second suspension element 120 is released from the object 130 by means of appropriately dimensioned magnetic coupling 140 between the second suspension element 120 and the object 130 (see principle above). During the shock (cf. FIG. 2), the excitation force ($F_e$) originating from the frame 200 exceeds the magnetic holding force ($F_h$) between the magnetically cooperating element 142, whereby the magnetic coupling 140 detaches thus decoupling the second suspension element 120 from the object 130. It is to be noted that all the forces act in the excitation direction ED. With the second suspension element 120 detached from the object 130, the object 130 (e.g. gyroscope) is suspended to the frame 200 (e.g. sea vessel) only through the first suspension element 110, which is softer than the second 120. The looser suspension isolates the object 130 from the frame 200 during the shock allowing the frame 200 to experience violent displacements without exerting excessive forces to the object 130.

Figure 2:
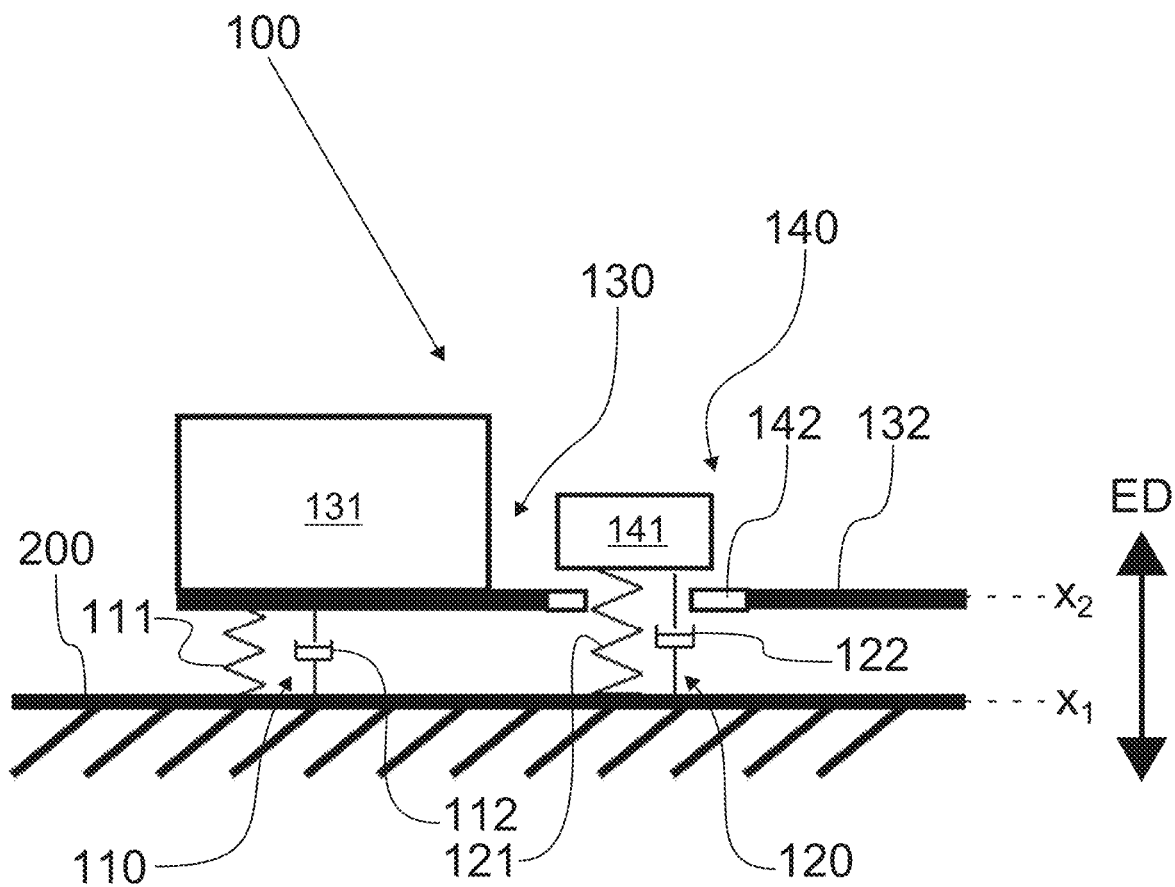
FIG. 2 presents a schematic illustration of the suspension arrangement of FIG. 1 during a shock.

After the frame 200 has returned to the rest position, the magnetic coupling 140 resumes its coupled configuration as the permanent magnet 141 attached to the second suspension element 120 and the magnetically cooperating element 142 attached to the object 130 return to the connected state (FIG. 1). The object 130 is therefore again rigidly suspended to the frame 200.

The above-described embodiment represents a mere example of the inventive concept for arranging a suspension for a mass in respect to a frame. It is to be understood that a similar inventive suspension arrangement could be established in a great number of variants to the examples of FIGS. 1 and 2. For example, the suspension elements 110, 120 could alternatively contain only a spring or damper or the first suspension element 110 could only include a spring, whereas the second suspension element 120 could only include a damper. Alternatively, the suspension elements 110, 120 could be set up in a combination of the examples given above. The suspension elements 110, 120 may also be actively controlled by adjusting the damping properties of the dampers, for example, by means of an electromagnetic adjustment. In addition to mere stiffness, the suspension elements 110, 120 may be set up differently in suspension characteristics in that the spring 111 of the first suspension element 110 may be regressive, whereas the spring 121 of the second suspension element 120 may be progressive or degressive, for example.

As concerns the magnetic coupling 140, the reattachable coupling between the second suspension element 120 and the object 130 may be provided in a number of different ways to that disclosed above. For example, the magnetically cooperating element may alternatively be provided to the second suspension element to combine the spring and damper. Similarly, the magnet may be provided to the coupling interface. Instead of a permanent magnet, which is disclosed as the preferred option, the magnet may be provided as an active magnet, which is employed electronically, when sensors detect a shock from the frame. While this option is feasible, it is not as fast and robust as the virtually instantaneous permanent magnet arrangement disclosed above.

Figure 3A:
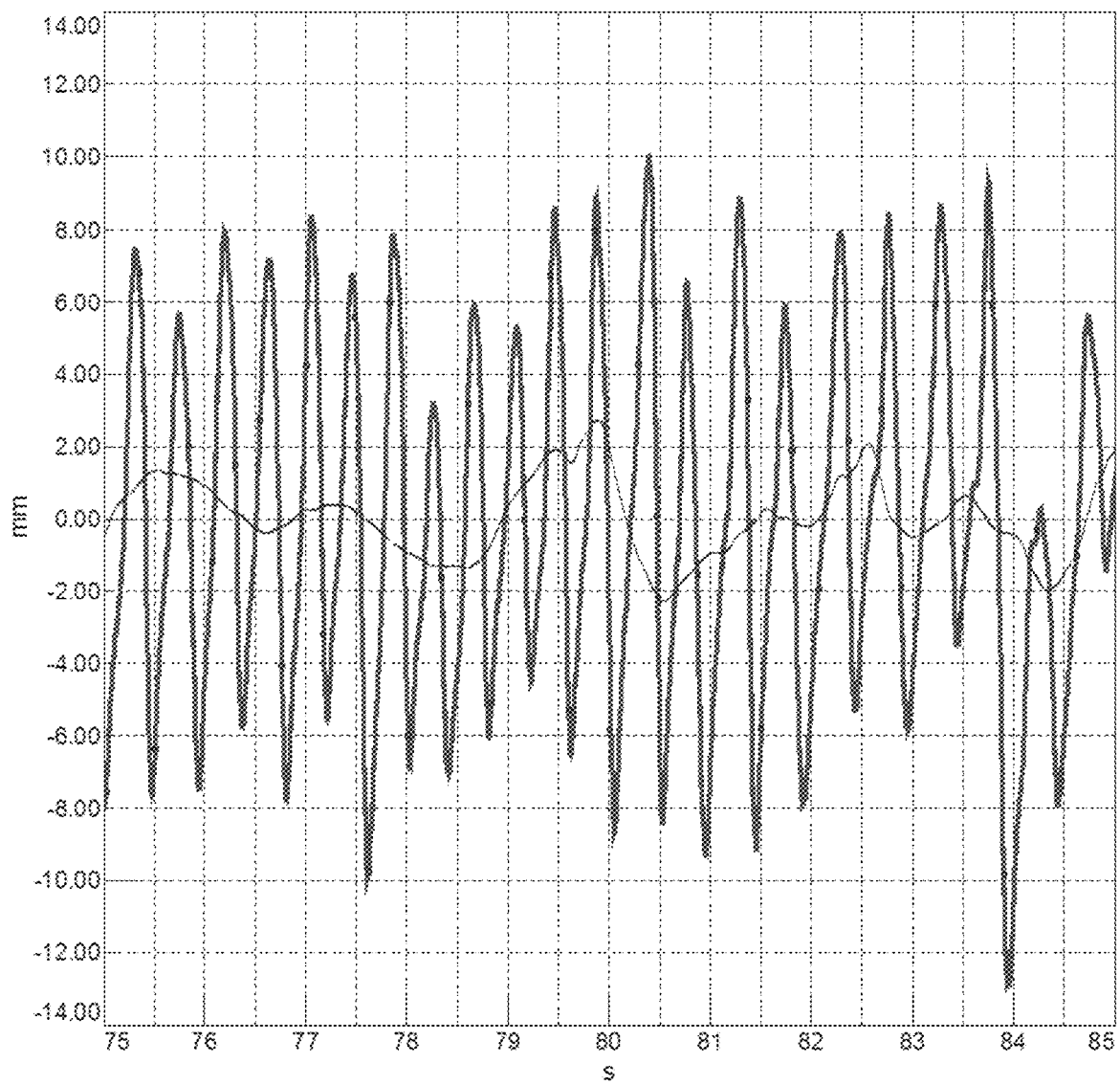
FIGS. 3a to 3c present graphs showing measurements of three tests of an arrangement of FIG. 1.
Figure 3B:
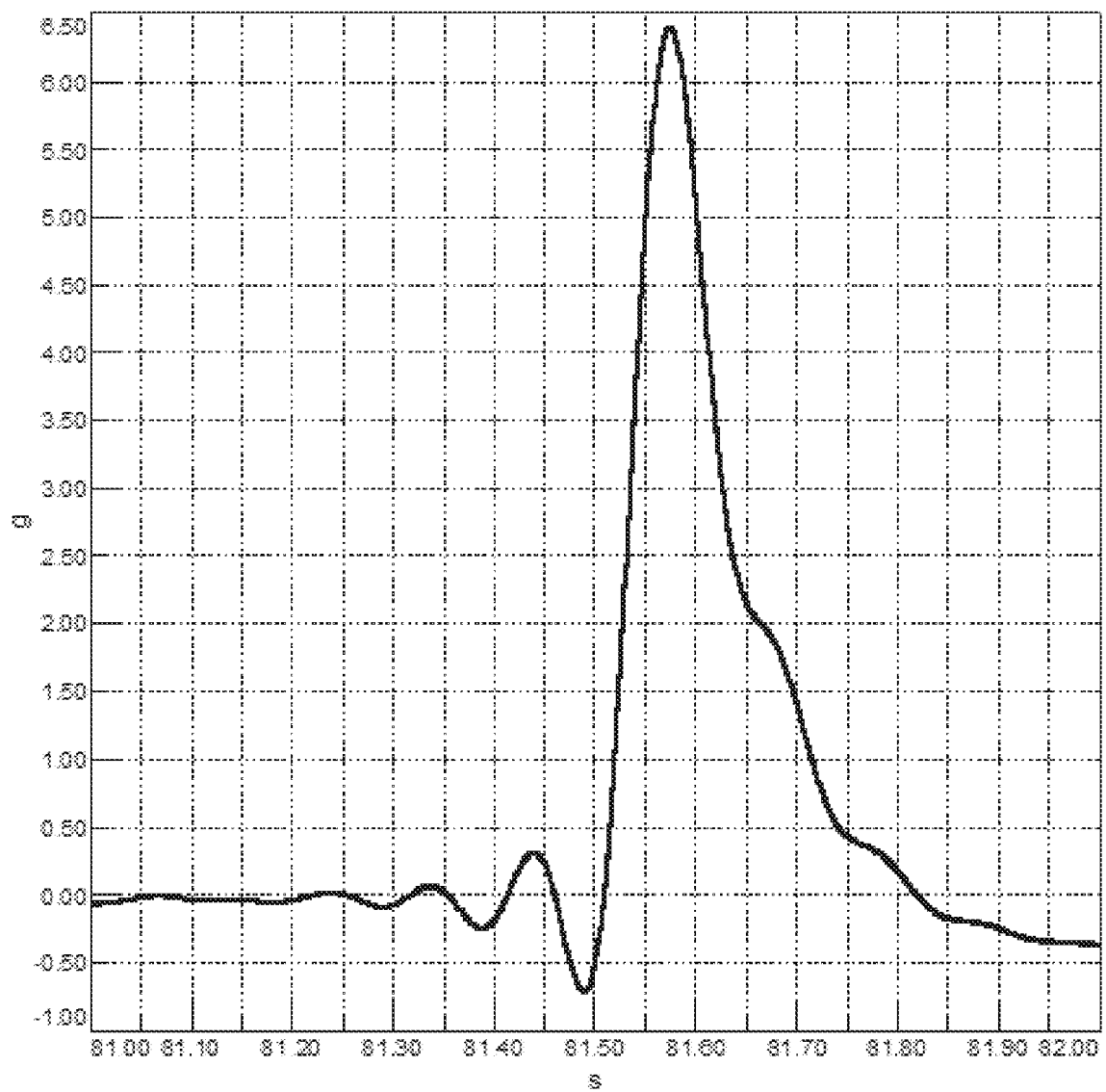
Figure 3C:
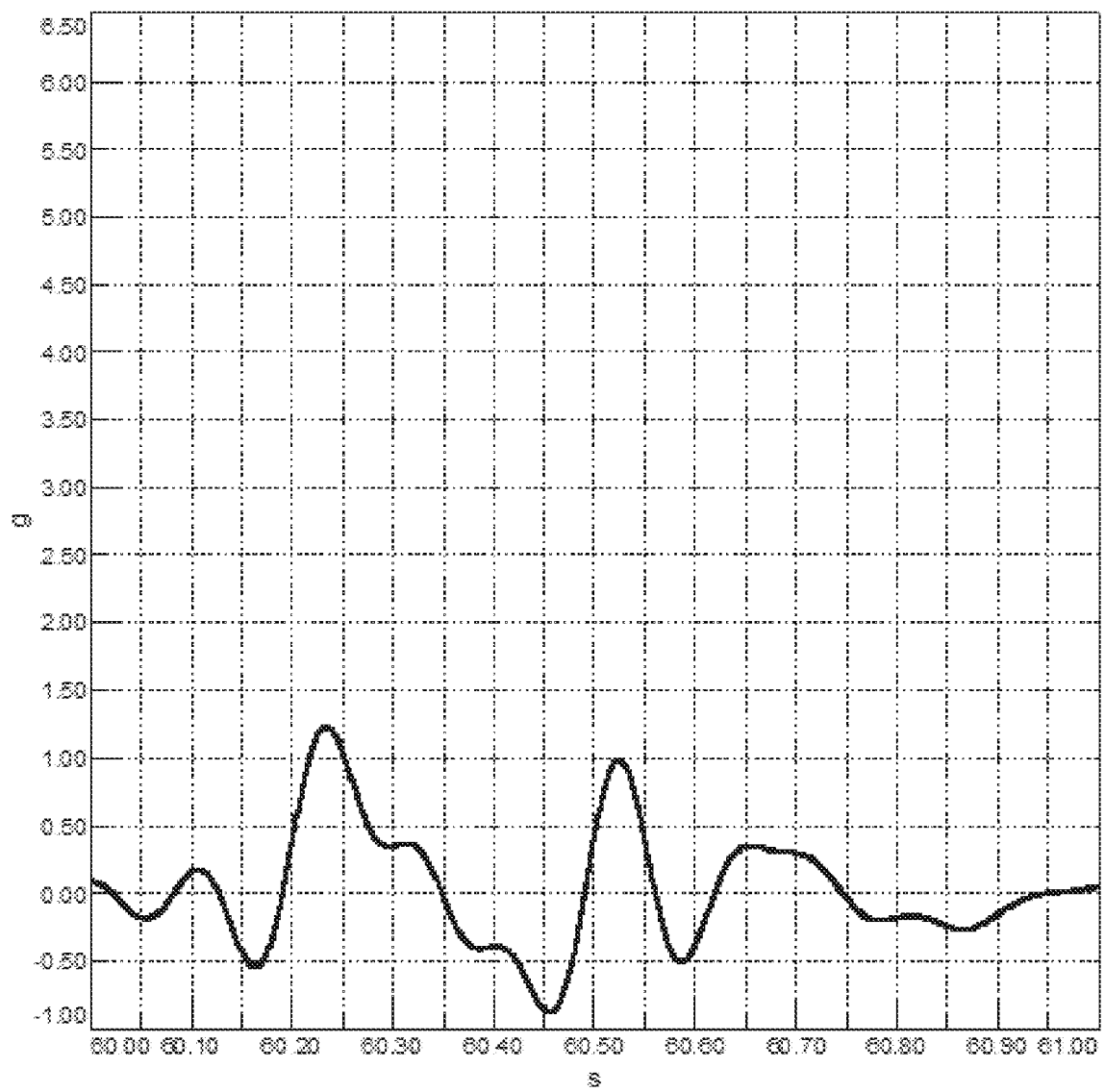

Turning now to FIGS. 3a to 3c, which present graphs showing measurements of two tests of an arrangement of FIG. 1. In the first study (FIG. 3a), a bicycle was tested effectively with three different rear suspension setups; first with the original stiff coil spring (stiffness: 132 N/mm) of the bicycle alone and then together with a loose coil spring (stiffness: 23 N/mm) coupled to a suspension arrangement 100 as shown in FIG. 1. The suspension arrangement was installed to the rear suspension of the bicycle with a loose coil spring (stiffness: 23 N/mm) in parallel with a magnet (holding force: 215 N) that was in series with stiff rubber spring (stiffness: 250 N/mm). First, the bicycle was driven uphill with a plain loose coil spring (FIG. 3a thick line) and then with the novel suspension arrangement (FIG. 3a thin line). The measurement results are presented in FIG. 3a in time domain (X-axis: time and Y-axis: relative displacement of rear suspension). The bicycle with a loose spring was bouncing up and down during the ride to uphill. With the novel suspension arrangement the stability was greatly improved. The difference between the loose spring and the novel suspension arrangement can be seen in FIG. 3a: with the loose spring the relative displacement is oscillating at natural frequency of spring-mass system with for example amplitude of +−8 mm. The oscillating amplitude is clearly lower with novel suspension arrangement and it is not steady state. The suspension is mainly taken care with stiff rubber spring during uphill ride with the novel suspension arrangement. If transient loads with higher than 215 N force occurs then the suspension changes to loose coil spring.

In the second study (FIGS. 3b and 3c), after the uphill study, the same bicycle was driven to a 6 cm high bump with the novel suspension arrangement (FIG. 3c) and with the original stiff coil spring (FIG. 3b). The measurement results are presented in the Figs. in time domain (X-axis: time and Y-axis: acceleration to vertical direction measured from middle of the bicycle frame). While the stability of the bicycle with the original stiff coil spring was good, it is apparent from FIG. 3b that the response during ride to bump was poor. With the novel suspension arrangement the stability was similar to original stiff spring, but and the response during ride to bump was excellent as can be seen from FIG. 3c. The difference between the stiff spring and the novel suspension arrangement is clear. With the stiff spring, the acceleration of the bicycle frame in vertical direction was approximately 6 g and with the novel suspension arrangement approximately 1 g (where g is gravity: 9.82 m/s$^2$). With the novel suspension arrangement the suspension is mainly handled by the stiff rubber spring during normal ride. When the transient load from the bump occurs, the suspension changes to loose coil spring giving smooth response. After the transient load the suspension changes back to stiff spring because the magnet holds, the loads during normal ride when the forces are less than 215 N.

Figure 5A:
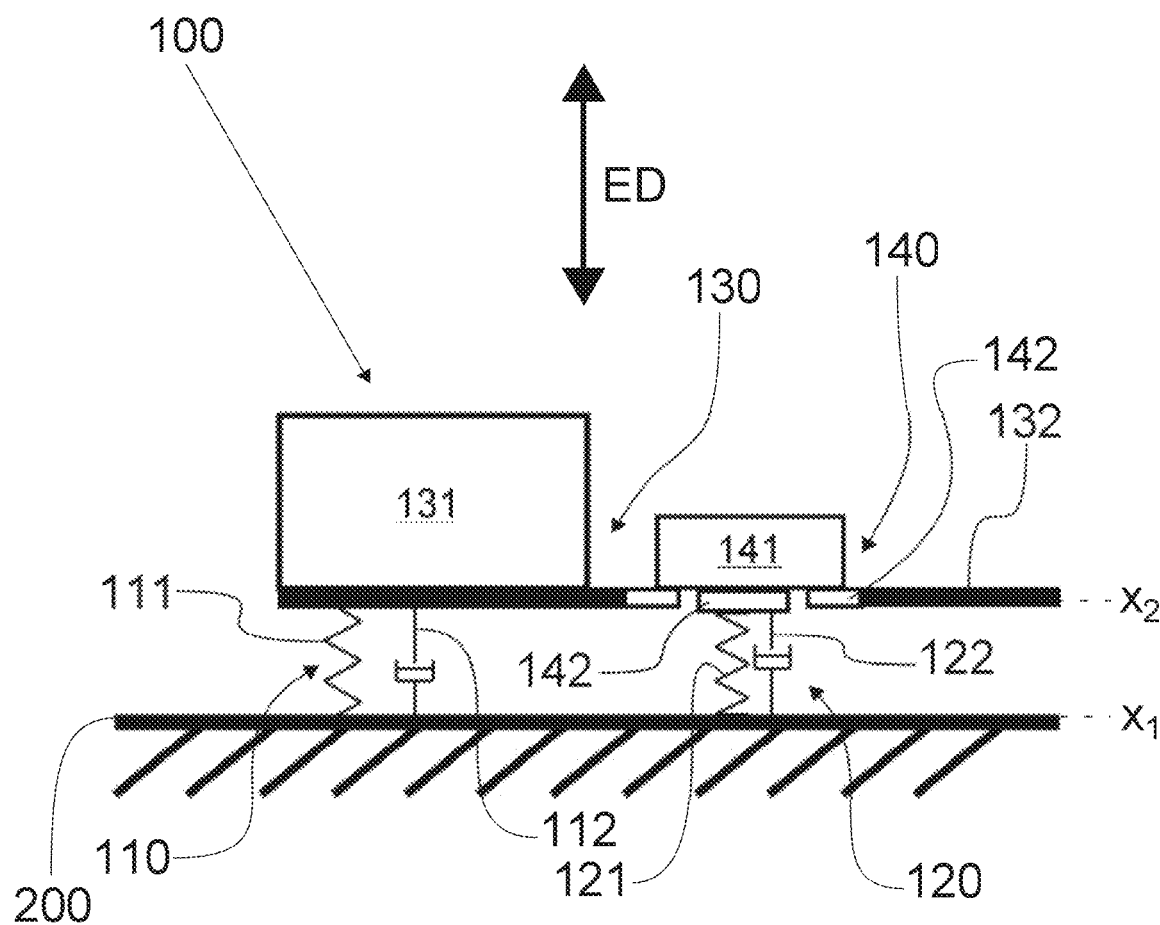
FIG. 5a presents a schematic illustration of a suspension arrangement according to a third embodiment before and after a shock.
Figure 5B:
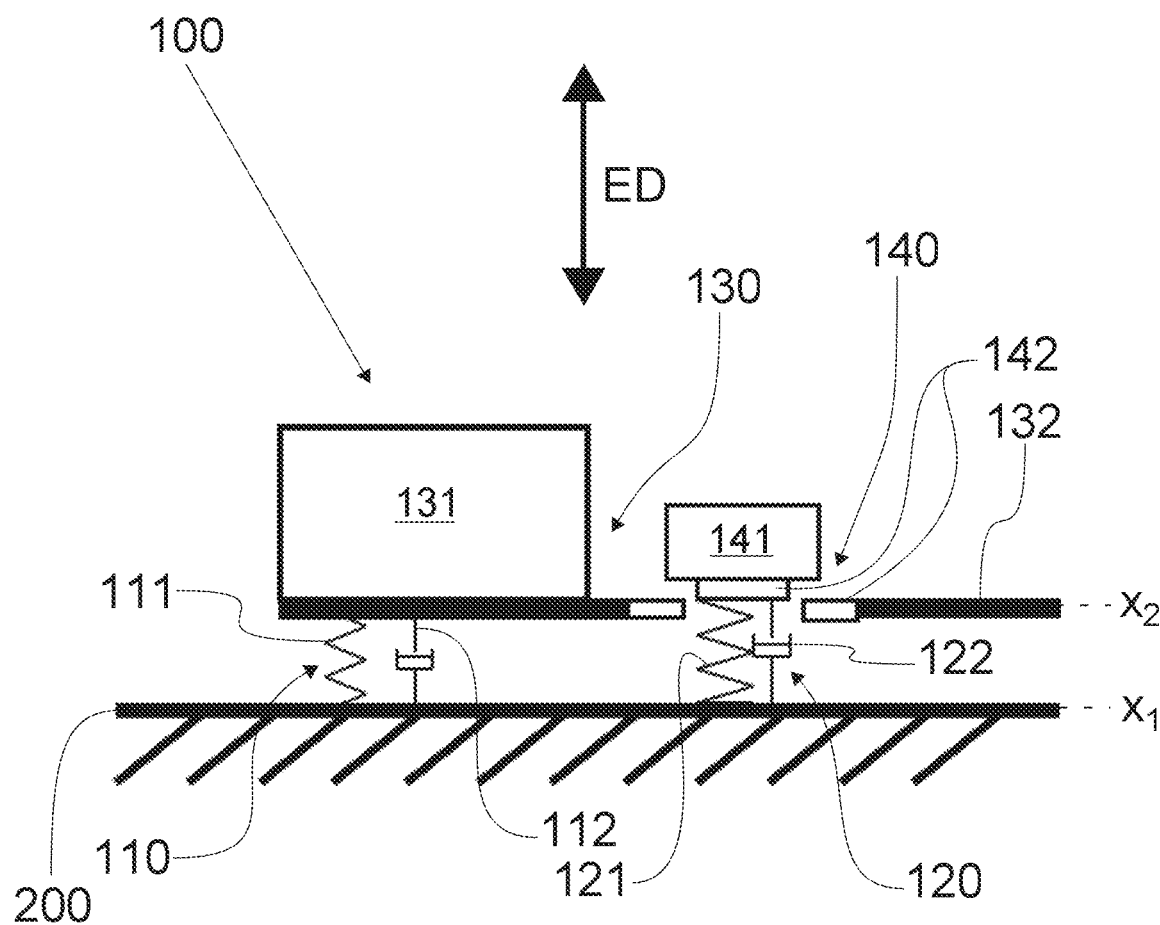
FIG. 5b presents a schematic illustration of the suspension arrangement of FIG. 5a during a shock, where the frame has moved upwards.
Figure 5C:
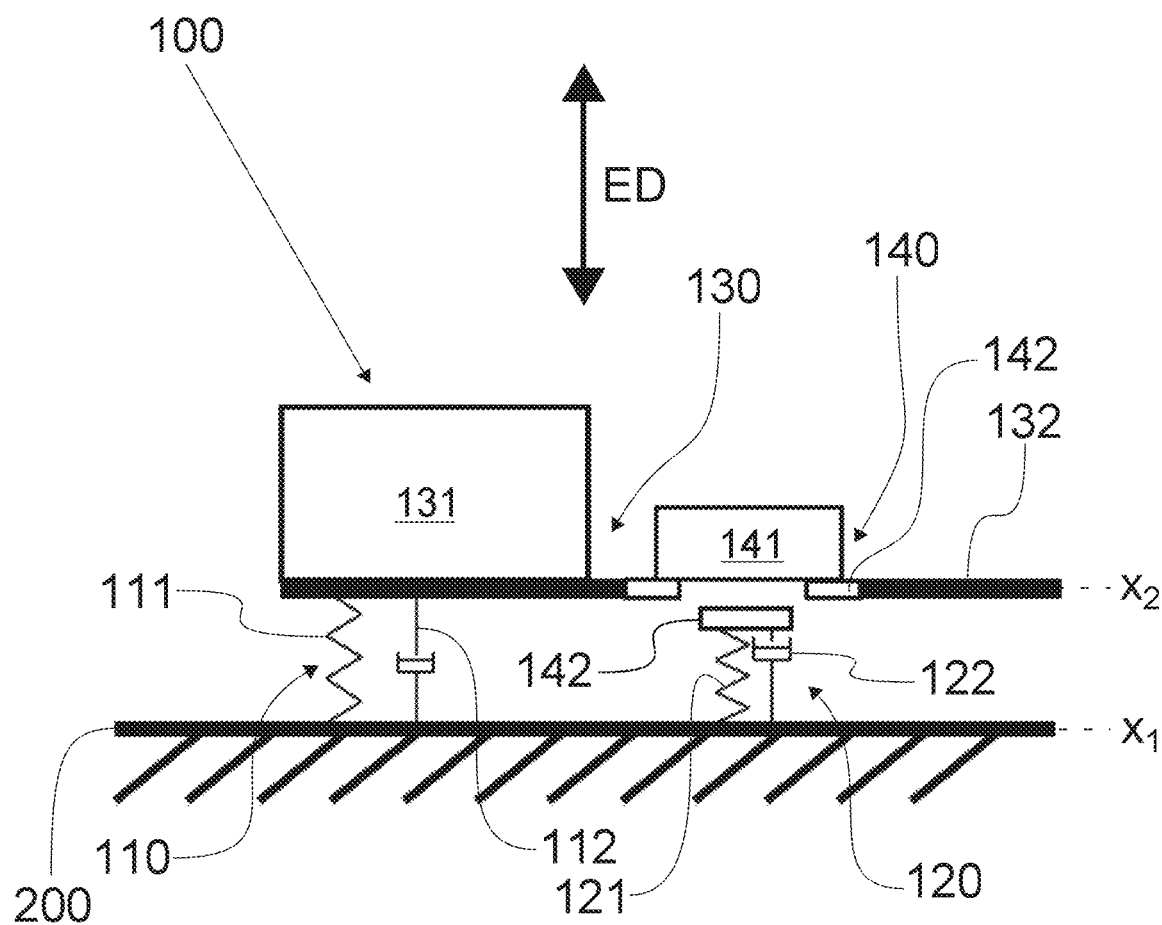
FIG. 5c presents a schematic illustration of the suspension arrangement of FIG. 5a during a shock, where the frame has moved downwards.

Next, exemplary dimensioning values for the components are presented by way of an example concerning isolating equipment in a vessel, which is anticipated to experience sudden shocks. A suspension arrangement was constructed similarly as illustrated in FIGS. 5a to 5c with the following specifications:

$m=300$ kg, $c_1=1400$ Ns/m, $k_1=70$ N/mm, $c_2=10000$ Ns/m, $k_2=0$ N/m, $x_2-x_1=30$ mm, $\dot{x}_1=2.2$ m/s, $\ddot{x}_2=500$ m/s$^2$, and $F_h=500$ N.

Figure 7:
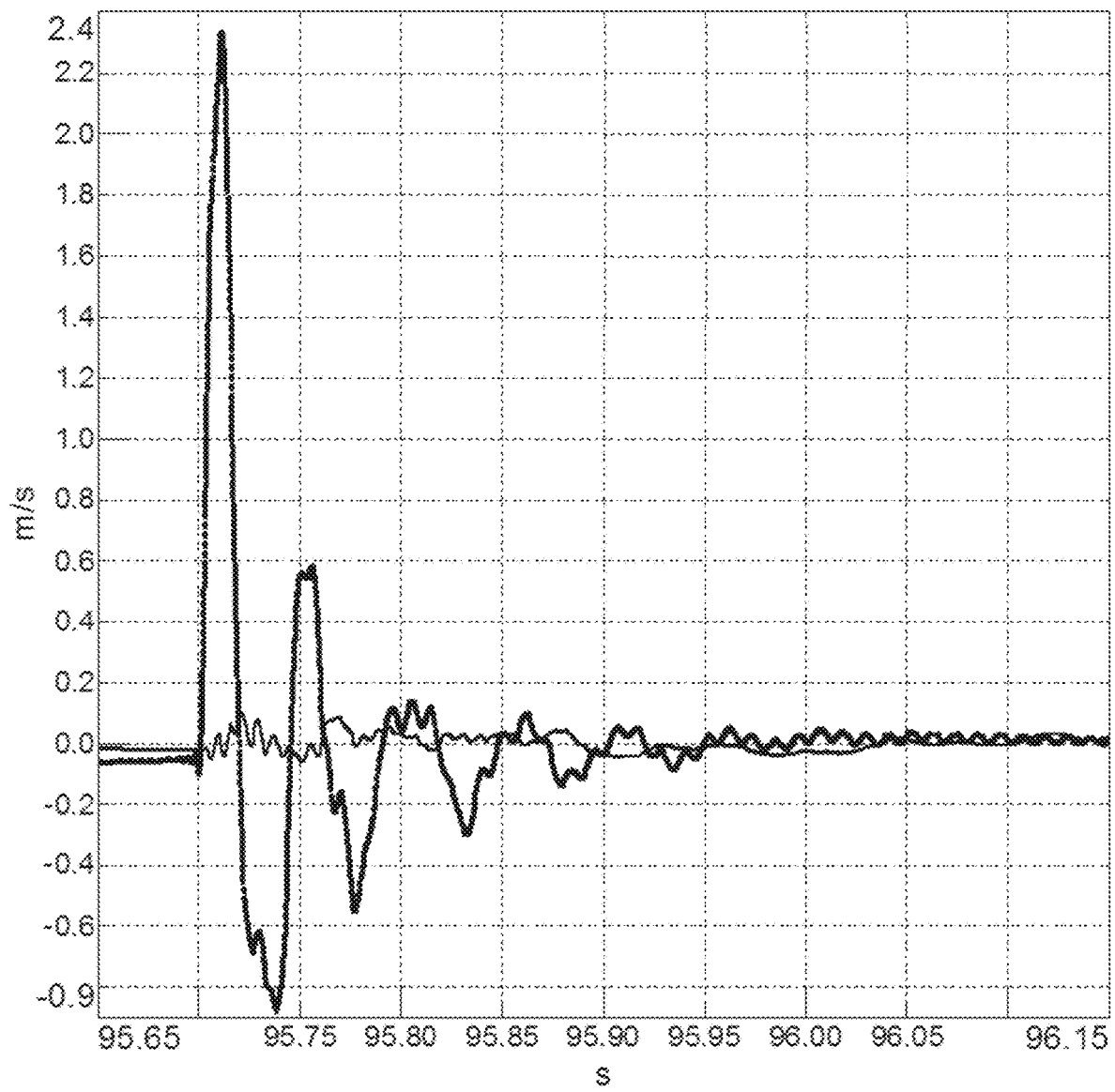
FIG. 7 presents a diagram illustrating test results of an excitation test performed with a suspension arrangement according to FIGS. 5a to 5c, where an excitation curve is shown in a dashed thick line and the response curve of the isolated object is shown a solid thin line.

The results of the test are shown in FIG. 7, which shows the measurements of the example of the novel suspension arrangement used in a shock test table to isolate a 300 kg mass (the values are given above). The measurement result is in time domain (horizontal axis is time and vertical axis is a velocity). The thick line is a excitation velocity and thin line is a response velocity of isolated 300 kg mass. As may be concluded, a considerable dampening effect was achieved.

TABLE 1

LIST OF REFERENCE NUMBERS.

| Number | Part |
|---|---|
| 100 | suspension arrangement |
| 110 | 1$^{st}$ suspension element |
| 111 | spring |
| 112 | damper |
| 120 | 2$^{nd}$ suspension element |
| 121 | spring |
| 122 | damper |
| 130 | object |
| 131 | mass |
| 132 | coupling interface |
| 140 | magnetic coupling |
| 141 | magnet |
| 142 | magnetically cooperating element |
| 200 | frame |
| $x_1$ | position of the object in a reference coordinate |
| $x_2$ | position of the object in a reference coordinate |
| ED | excitation direction |

The invention claimed is:

1. A suspension arrangement for suspending an object to a frame and for protection against excessive excitation forces ($F_e$) transmitted between the frame and the object, the arrangement comprising:
   a first suspension element, which is configured to directly suspend the object to the frame, and
   a second suspension element, which is configured to suspend the object to the frame,
   wherein
   the second suspension element is configured to suspend the object to the frame through a magnetic coupling between the object and the second suspension element, wherein the magnetic coupling comprises a permanent magnet, and wherein
   the suspension arrangement is configured to magnetically decouple the second suspension element from the object when the excitation force ($F_e$) transmitted between the frame and the object exceeds a magnetic coupling force ($F_h$).

2. The suspension arrangement according to claim 1, wherein the second suspension element has dynamic properties different to those of the first suspension element.

3. The suspension arrangement according to claim 1, wherein the dynamic properties of the first and second suspension element provide at least one of a stiffer suspension or greater damping than the dynamic properties of the first suspension element alone.

4. The suspension arrangement according to claim 1, wherein the dynamic properties of the second suspension elements provides at least one of a stiffer suspension or greater damping than the dynamic properties of the first suspension element.

5. The suspension arrangement according to claim 1, wherein where the excitation forces ($F_e$) occur in an excitation direction (ED), the suspension elements are configured to suspend the object in the excitation direction (ED).

6. The suspension arrangement according to claim 1, wherein the first suspension element is configured to permanently suspend the object to the frame.

7. The suspension arrangement according to claim 1, wherein the first suspension element is configured to carry the load of the mass caused by gravity and the second suspension element is configured to carry only dynamic loads until the excitation force ($F_e$) exceeds the magnetic coupling force ($F_h$), during which period the first suspension element is configured to carry dynamic loading until the magnetic coupling recouples.

8. The suspension arrangement according to claim 1, wherein the magnetic coupling force ($F_h$) is greater than any static friction force within the magnetic coupling.

9. The suspension arrangement according to claim 1, wherein the suspension arrangement further comprises a plurality of suspension arrangements in series, connected to each other such that the magnetic coupling forces ($F_h$) between the suspension arrangements vary for providing different thresholds for decoupling the magnetic couplings under different loads.

10. The suspension arrangement according to claim 1, wherein a portion of the object and a portion of the second suspension element are mutually engaging and wherein the magnetic coupling comprises:
    the permanent magnet connected to either of said engaging portions, and
    a magnetically cooperating element to the other engaging portion.

11. The suspension arrangement according to claim 10, wherein the magnetic coupling force ($F_h$) is greater than any static friction force between the permanent magnet and the magnetically cooperating element of the magnetic coupling.

12. The suspension arrangement according to claim 1, wherein the first suspension element or the second suspension element or both comprise(s):
    a spring, or
    a damper, or
    both a spring and a damper.

13. The suspension arrangement according to claim 12, wherein:
    the damping constant ($c_2$) of the damper of the second suspension element is greater than the damping constant ($c_1$) of the damper of the first suspension element, or
    the spring constant ($k_2$) of the spring of the second suspension element is greater than the spring constant ($k_1$) of the spring of the first suspension element, or
    the damping constant ($c_2$) of the damper of the second suspension element is smaller than the damping constant ($c_1$) of the damper of the first suspension element while the spring constant ($k_2$) of the spring of the second suspension element is greater than the spring constant ($k_1$) of the spring of the first suspension element or
    the damping constant ($c_2$) of the damper of the second suspension element is greater than the damping constant ($c_1$) of the damper of the first suspension element while the spring constant ($k_2$) of the spring of the second suspension element is smaller than the spring constant ($k_1$) of the spring of the first suspension element or
    both the damping constant ($c_2$) of the damper of the second suspension element and the spring constant ($k_2$) of the spring of the second suspension element are greater than the damping constant ($c_1$) of the damper of the first suspension element and the spring constant ($k_1$) of the spring of the first suspension element, respectively.

* * * * *